(12) United States Patent
Lyman et al.

(10) Patent No.: US 6,356,635 B1
(45) Date of Patent: Mar. 12, 2002

(54) HEADBAND FOR REVERSIBLE MOUNTING OF HEADSETS

(75) Inventors: Stephen R. Lyman, Dracut; James T. MacDonald, Pepperell; John DePiano, Jr., Burlington; Roy Heinz, Waltham, all of MA (US)

(73) Assignee: GN Netcom/Unex Inc., Nashua, NH (US)

( * ) Notice: Subject to any disclaimer, the term of this patent is extended or adjusted under 35 U.S.C. 154(b) by 0 days.

(21) Appl. No.: 09/312,443

(22) Filed: May 14, 1999

(51) Int. Cl.$^7$ ................................................ H04M 1/00
(52) U.S. Cl. ...................................................... 379/430
(58) Field of Search ................................ 379/430, 447; 381/370, 376, 377, 378, 379

(56) References Cited

U.S. PATENT DOCUMENTS

| | | | |
|---|---|---|---|
| 1,587,643 | A | 8/1926 | Harman |
| 2,474,135 | A | 6/1949 | White |
| 2,481,387 | A | 9/1949 | Bonecutter |
| 2,485,405 | A | 10/1949 | Olney et al. |
| 2,506,490 | A | 5/1950 | Coley |
| 2,513,746 | A | 7/1950 | Rohr |
| 2,586,644 | A | 2/1952 | Gilbert |
| 2,606,255 | A | 8/1952 | Tullis |
| 2,939,923 | A | 6/1960 | Henderson |
| 3,440,365 | A | 4/1969 | Bryant et al. |
| 3,682,268 | A | 8/1972 | Gorike |
| 3,862,378 | A | 1/1975 | Norris |
| D237,090 | S | 10/1975 | Yanagawa |
| 3,993,879 | A | 11/1976 | Larkin |
| D242,724 | S | 12/1976 | Brodie |
| 4,020,297 | A | 4/1977 | Brodie |
| 4,048,453 | A | 9/1977 | Seidel |
| 4,118,606 | A | 10/1978 | Larkin |
| D272,904 | S | 3/1984 | Kawano |
| D293,107 | S | 12/1987 | Muller |
| 4,864,610 | A | 9/1989 | Stevens |
| 4,893,344 | A | 1/1990 | Tragardh et al. |
| D311,521 | S | 10/1990 | Jonsson et al. |
| 4,972,468 | A | 11/1990 | Murase et al. |
| 5,035,005 | A | * 7/1991 | Hung .......................... 379/430 |
| 5,058,155 | A | 10/1991 | Larsen |
| D326,653 | S | 6/1992 | Hino |
| 5,191,602 | A | 3/1993 | Regen et al. |
| 5,210,792 | A | 5/1993 | Kajihara |
| 5,233,650 | A | * 8/1993 | Chan .......................... 379/430 |
| D339,355 | S | 9/1993 | Burris et al. |
| D357,479 | S | 4/1995 | Coomans |
| 5,412,736 | A | 5/1995 | Keiliiliki |
| 5,446,788 | A | 8/1995 | Lucey et al. |
| D363,487 | S | 10/1995 | Thurnau |
| D366,486 | S | 1/1996 | Runquist et al. |
| D375,313 | S | 11/1996 | Jensen et al. |
| 5,625,171 | A | 4/1997 | Marshall |
| 5,655,026 | A | 8/1997 | Peters et al. |
| D384,958 | S | 10/1997 | Shudo |
| D385,272 | S | 10/1997 | Jensen et al. |
| 5,708,724 | A | 1/1998 | Burris et al. |
| 5,715,321 | A | 2/1998 | Andrea et al. |
| 5,729,615 | A | 3/1998 | Yang |
| 5,757,944 | A | 5/1998 | Jensen et al. |
| 5,796,821 | A | 8/1998 | Crouch et al. |
| D403,327 | S | 12/1998 | Landreth et al. |
| D407,089 | S | 3/1999 | Norin |
| D409,621 | S | 5/1999 | Andrea |

FOREIGN PATENT DOCUMENTS

| | | |
|---|---|---|
| AU | 436377 | 10/1926 |
| EP | 0158391 | 10/1985 |
| GB | 1377237 | 12/1974 |
| GB | 20365505 | 6/1980 |

* cited by examiner

*Primary Examiner*—Jack Chiang
(74) *Attorney, Agent, or Firm*—Altera Law Group LLC

(57) ABSTRACT

A headband for reversible mounting of headsets, wherein the headset can be used on either side of the wearer's head. The headband may include two adjustably connected portions, for adapting to the wearer's head. On one side, the headband has a fitting for a headset. The fitting may include a plurality of tabs surrounding a substantially circular cavity. The headset may be mounted to the headband by fitting at least a part of the headset inside the cavity, wherein the headset is held in place by the tabs. The tabs may be arranged to allow the headset to extend therebetween, and they may allow the headset to be adjusted as desired by the wearer.

6 Claims, 2 Drawing Sheets

HEADBAND FOR REVERSIBLE MOUNTING OF HEADSETS

FIELD OF THE INVENTION

The invention relates to headsets. In particular, the invention relates to headbands for reversible mounting of headsets.

BACKGROUND OF THE INVENTION

So-called headsets are used in a variety of situations for allowing audio communication between a person and a communications network, for example. In a typical situation, a person wears a headset including a microphone and a transducer, which headset is connected to a telephone network. The person is then able to make telephone calls and answer incoming calls without having to hold a traditional telephone receiver. The person can use both hands for taking notes, accessing a computer keyboard, etc.

The traditional headset consists essentially of a headband supported over the wearer's head, at least one transducer adjacent the wearer's ear, and a microphone. The microphone is typically suspended at the end of a boom which extends from the part of the headset which comprised the transducer, or from the headband.

More recent developments in the area of headsets have brought forward a category of headsets which are suspended from the wearer's ear, without a headband being positioned over the wearer's head. Some of these headsets have a suspension element that is curved to essentially match some part of the wearer's ear. The suspension element is a part of, or attached to, the main headset element. The main headset element typically comprises the transducer and microphone as well as circuitry, etc. Another part of the headset, typically the sound-producing transducer, will be positioned abutting substantially near the wearer's ear, to facilitate good audio perception while using the headset. Other examples of headsets utilize a form-fitted element which substantially conforms to the shape of the opening of the ear canal, whereby it holds the headset in a correct working position.

However, there are disadvantages associated with the latter kinds of headsets, which do not use a headband. Generally, they are less securely mounted on the wearer's head than headsets having a headband. The consequence is that the wearer may inadvertently drop the headset, for example while making an agitated motion with the head, as well as when the headset bumps into a fixed object, or when the cord becomes entangled. Typically, the headset will then fall off, which is of course a most disturbing experience, particularly if it happens while the wearer is engaged in a conversation communicated through the headset. Furthermore, there is a risk that the headset, which includes sensitive electronic equipment, will be damaged or destroyed if it falls from an elevated position on a wearer's head onto the floor. Thus, it can be seen that there is a need for a headband for headsets, whereby a headset can be mounted onto the headband for increased security and accuracy in operation.

Another disadvantage with some existing headsets is that they are adapted for use on only one side of the wearer's head. For example, a headset may be configured such that it will only fit over or on the wearer's right ear with the microphone of the headset extending toward the wearer's right cheek or chin. Extended use of a headset on one side of the head, without the option of switching to the other side, might lead to distress, frustration and irritation due to the prolonged unadjustable exposure. Furthermore, in some situations the wearer's working position will dictate that a headset should be worn on one particular side of the head. For example, in customer service positions the wearer of the headset may be required to communicate with customers directly, as well as electronically through the headset. It may then be desirable for the wearer to use the headset on the side of the head which generally faces away from a physically present customer, such that the person-to-person communication is not affected by the presence of the headset.

Therefore, it may be desirable that a headset designed for use without a headband, can also be used with a headband when so is preferred. Thus, it can be seen that there is a need for a headband which provides reversible mounting of a headset, whereby the headset can be used on either side of the wearer's head.

SUMMARY OF THE INVENTION

The present invention relates generally to headsets, and in particular to headbands which are capable of reversibly mounting the headset for use on either side of the head.

A headband for headsets, comprising a member capable of being positioned on a wearer's head. The member is provided with a fitting for a headset, comprising a plurality of holding members. The plurality of holding members enclose a cavity configured to receive a part of the headset, wherein the headset can be releasably mounted to the fitting by the holding members such that the headband can be worn with the headset on either side of the wearer's head. The holding members may have a tab at their ends facing radially toward the cavity.

One holding member may be positioned substantially opposite from where the fitting is attached to the headband. Two adjacent holding members are spaced apart to allow the headset to extend therebetween. The two adjacent holding members may be spaced apart to allow the headset to be adjustably situated therebetween.

A headband for headsets comprising at least first and second sections capable of being positioned on a wearer's head. The sections are adjustably connected to each other for adjusting the headband to the wearer's head. The headband further comprises a fitting for a headset on the first section and a head support on the second section. The fitting is mounted to the first section by a rotation coupling. The head support comprises an extended member rotatably mounted in a direction transversal to the second section. The fitting comprises a substantially circular open casing with three tabs positioned around the casing. The tabs partially cover the casing, wherein a headset can be adjustably mounted inside the casing and held in place by the tabs. One tab is positioned opposite to the rotation coupling, allowing the headset to be mounted in the fitting two such that the headband can be worn with the headset on either side of the wearer's head.

A headset-carrier comprising a headband capable of supporting a headset adjacent to a wearer's head. The headset-carrier further comprises means for reversibly mounting the headset to the headband, wherein the headset carrier can be used on either side of the wearer's head.

These and various other advantages and features of novelty which characterize the present invention are pointed out with particularity in the claims annexed hereto and forming a part hereof. However, for a better understanding of the present invention, its advantages, and other objects obtained by its use, reference should be made to the drawings which form a further part hereof, and to the accompanying descriptive matter, in which preferred embodiments of the present invention are illustrated and described.

BRIEF DESCRIPTION OF THE DRAWINGS

The present invention will be described with reference to the accompanying drawings, wherein like reference numerals identify corresponding or like components, and wherein.

DETAILED DESCRIPTION OF PREFERRED EMBODIMENTS

Figure 1:
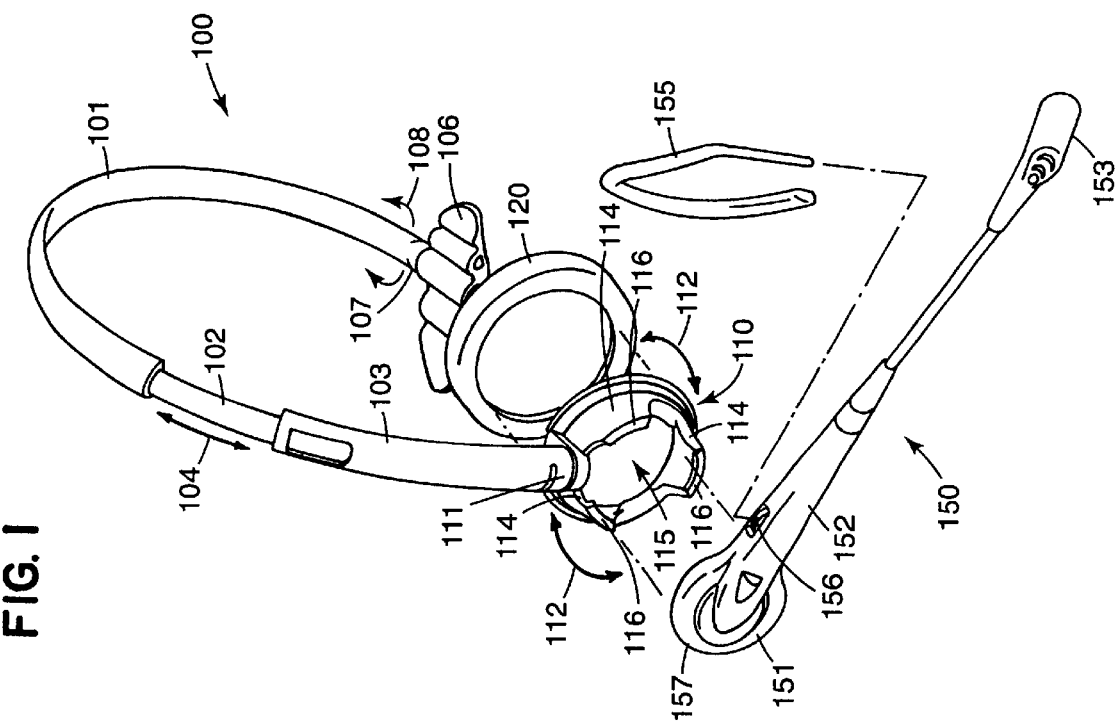
FIG. 1 is a perspective explosion view of an embodiment in accordance with the present invention.

FIG. 1 shows an embodiment of the headband 100 in accordance with the present invention. The headband 100 can be positioned over a wearer's head, to allow the wearer to use a headset. The headband 100 comprises a first portion 101. The portion 101 has a curved shape to allow fitting around the shape of the head, and it comprises a blade 102 extending from one of its ends. The blade 102 is adjustably connected to a second portion 103 of the headband 100. The adjustability of the two portions allow the headband 100 to be size-adjusted as indicated by arrow 104.

The headband 100 further comprises a headrest 106 connected to the first portion 101. The headrest 106 is used to provide a more comfortable and secure fit of the headband 100 on the wearer's head. The headrest 106 may be rotatably mounted to the first portion 101 as indicated by arrow 108. The headrest 106 may, for example, be mounted using a rotation coupling 107.

The headband 100 further comprises a fitting 110, connected to the second portion 103. The fitting 110 will be used to mount a headset 150 to the headband 100, allowing the wearer to use the headset 150 with a headband 100. The fitting 110 may be rotationally coupled to the second portion 103, as indicated by arrows 112. For example, the fitting 110 may be connected through a rotation coupling, such as a swivel 111.

The fitting 110 comprises three holding members 114. In the shown embodiment, the three holding members 114 together form a substantially circular casing. In other embodiments, the holding members 114 may be provided with different configurations. The holding members 114 will be used to secure the headset 150 when it is mounted on the headband 100. In a particular application, the three holding members 114 may be provided with a shape and/or configuration which allows them to fit closely around a part of the headset 150.

In the embodiment shown in FIG. 1, the holding members 114 have a slightly curved shape allowing them to fit snugly around a rounded portion 157 of the transducer end 151 of the headset 150. A close fit between the holding members 114 and the rounded portion 157 allows for both a secure mounting of the headset 150, and may allow the headset 150 to be adjustably mounted within the fitting 110, as will be described below.

As can be seen in FIG. 1, the fitting 110 has a substantially symmetrical configuration about a vertical axis when the headband 100 is worn. The three holding members 114 are configured to form a cavity 115 in between them, and one of the three holding members 114 is situated substantially opposite from the swivel 111.

The fitting 110 may be provided with an ear pad 120. When, as in the shown embodiment, the cavity 115 extends through the entire fitting 110, it allows for good conveyance of sound from the headset 150 to the wearer's ear. The ear pad 120 covers the fitting, including the opening from the cavity 115, in order to make the headband 100 more comfortable.

The shown headset 150 is merely one example among many which can be used with the headband 100. The headset 150 comprises a transducer end 151 and a microphone end 153. The transducer end 151 and the microphone end 153 are connected by the main body 152. The shown headset 150 further comprises an earhook 155 that is adjustably mounted in a clutch 156 in the main body 152. Thus, the exemplary headset 150 is one that can be used without the headband 100, by fitting the earhook 155 over the wearer's ear. The transducer end 151 thereby rests against the outer ear and the positioning of the headset 150 may be adjusted by the clutch 156. However, as has been described in the background of the invention, it may be desirable to use the above-described headset 150 with a headband 100 instead. The headset 150 can thereby be conveniently mounted to the headband 100 via the fitting 110.

In the embodiment shown in FIG. 1, tabs 116 are provided at the ends of the holding members 114. The tabs 116 face radially inward toward the cavity 115, whereby they may be used to hold the headset 150 in place. The size and/or configuration of the tabs 116 may be chosen in consideration of the application in which the headband 100 is being used. In particular, the tabs 114 may be provided so as to conform to the particular shape of the transducer end 151 of the headset 150 that is being used. In some applications, the holding members 114 secure the transducer end 151 by their resilient pressure thereagainst and/or surface friction.

Figure 2:
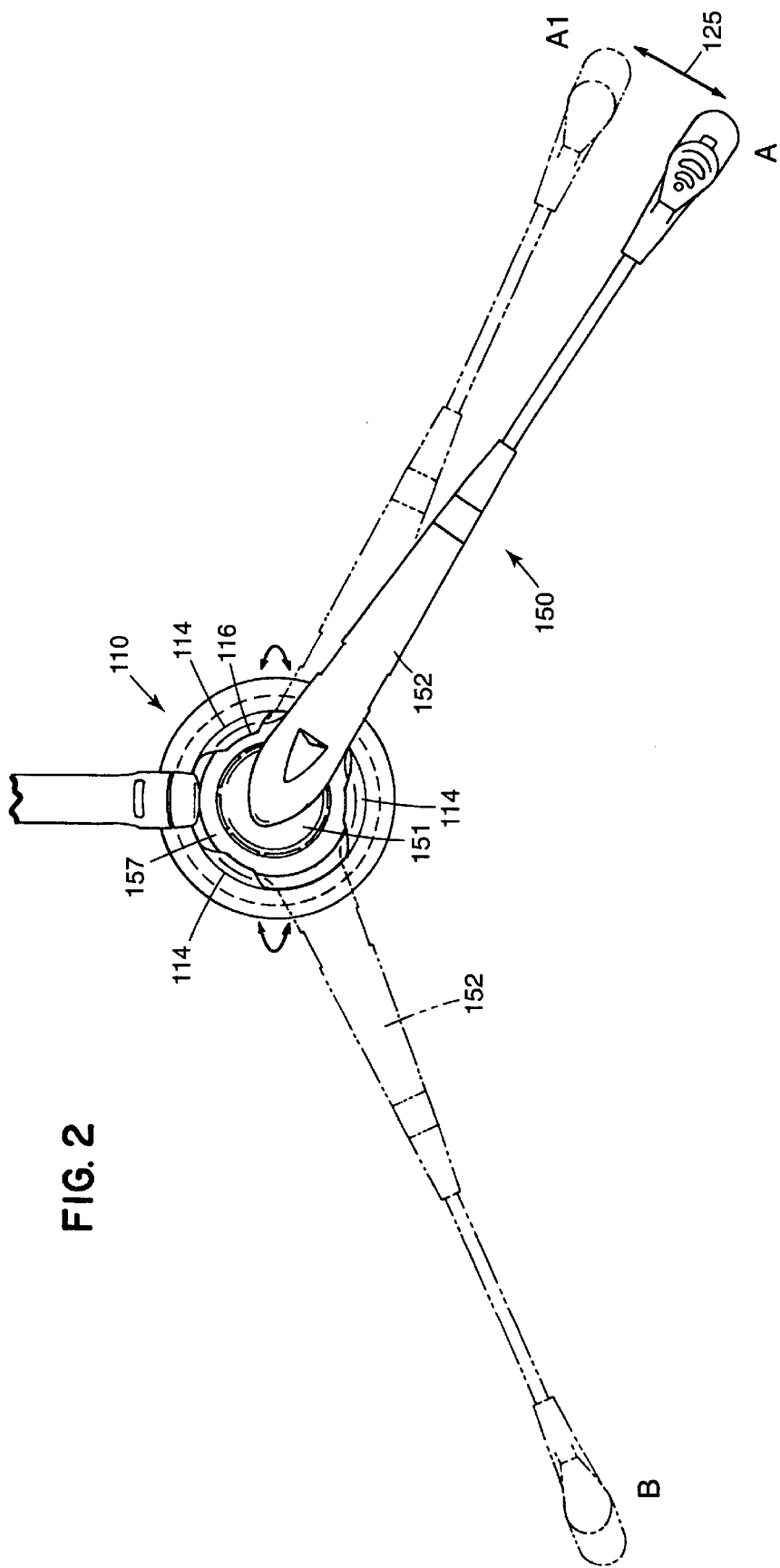
FIG. 2 is a partial view showing reversible and adjustable mounting of a headset.

FIG. 2 shows a partial view of the embodiment with the headset 150 mounted in the fitting 110. The transducer end 151 has been positioned in the cavity 115 such that the main body 152 extends between two of the holding members 114. The headset can be gradually adjusted between the position A and the position Al (shown in phantom) as indicated by the arrow 125. The rounded portion 157 of the transducer end 151 is slidably retained within the cavity 115.

The main body 152 extends in a passage between two of the holding members 114. In the shown embodiment, the main member 152 is narrower than the passage between the holding members 114, whereby the headset 150 can be adjusted as described. In other embodiments, the main body 152 may have substantially the same width as the passage between the holding members 114, such that it essentially is not adjustable therebetween.

The headset 150 can be mounted in the fitting 110 from another direction, as shown by the phantom position B. In the shown embodiment, where the fitting 110 is substantially symmetrical about a vertical axis, the main body 152 can be mounted between two of the holding members 114 in a configuration substantially symmetrical to that shown at A. This may, for example, allow the headband 100 with the headset 150 to be worn on either side of the wearer's head. The two holding members 114 between which the main body 152 extends in the phantom position B may be positioned such that the headset 150 is gradually adjustable therebetween, in analogy to the positions A and A1.

Thus, the headband 100 allows convenient mounting of headsets, such as the headset 150. The headset can be adjustably retained by the headband, and it can be mounted in different directions such that the headband can be worn with the headset on either side of the head.

While the invention has been described in connection with an embodiment, it will be understood that the invention is not limited to that embodiment. The invention is intended to cover all alternatives, modifications and equivalents as may be included within the spirit and scope thereof, as defined by the appended claims.

We claim:

1. A headband for headsets, the headband comprising:

a member capable of being positioned on a wearer's head, the member provided with a fitting for receiving a headset;

wherein the fitting comprises a retaining ring defining a cavity therein for receiving a portion of said headset, a casing including a plurality of holding members extending generally orthogonally outwardly from the retaining ring in a direction generally away from the wearer, a tab on each of said holding members extending inwardly from the respective holding member into said cavity, thereby creating a narrowed opening to said cavity, so that the headset is retainable within said cavity by the retention effect of said tabs when the headset is inserted therein, so that the earpiece can be removed at any position.

2. A headband for headsets having earpiece transducer and a body extension, the headband comprising:

a member capable of being positioned on a wearer's head, the member provided with a fitting for receiving a headset;

wherein the fitting comprises a retaining ring defining a cavity therein for receiving a portion of said headset, a casing including a plurality of holding members extending generally orthogonally outwardly from the retaining ring in a direction generally away from the wearer, said holding members extending inwardly into said cavity, thereby creating a narrowed opening to said cavity such that the cavity is at least in part, smaller than the transducer portion of the headset so as to create a inwardly biasing retention force on the transducer when inserted into the cavity, at least one gap between holding members, said gap providing a passageway in said casing to permit the passage of the body extension of the headset to pass therethrough, while still retaining said headset.

3. A headband according to claim 2 wherein said at least one gap is of sufficient extent to allow rotational movement of said headset within said cavity and permit the movement of the body extension to be adjusted to different radial positions to suit the wearer's desire.

4. A headband according to claim 3, wherein the fitting is swivelable to accommodate a wearer's right or left ear and wherein said casing includes at least two holding members with at least two corresponding gaps, said gaps being located between said members such that the body extension may protrude thru the gaps and extend toward the wearer's mouth whether the headband is configured for right of left ear usage.

5. A headband according to claim 3 wherein the gap is sized, relative to the headset to allow rotational movement of the headset within limits defined by the gap.

6. A headband according to claim 3 wherein said casing includes at least two holding members with at least two corresponding gaps, said gaps being located between said members such that the body extension may protrude through the gaps and extend toward the wearer's mouth whether the headband is configured for right or left ear usage.

* * * * *